United States Patent
Dube et al.

(10) Patent No.: US 7,516,093 B1
(45) Date of Patent: Apr. 7, 2009

(54) METHOD AND SYSTEM FOR AUCTION OF ASSETS WITH NON-EXCLUSIVITY OF USE

(75) Inventors: Parijat Dube, Yorktown Heights, NY (US); Rahul Jan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/164,207

(22) Filed: Jun. 30, 2008

(51) Int. Cl.
*G06Q 30/00* (2006.01)

(52) U.S. Cl. ............................... 705/26; 705/1; 705/27; 705/37

(58) Field of Classification Search ............. 705/1, 705/26, 27, 37
See application file for complete search history.

(56) References Cited

U.S. PATENT DOCUMENTS

| | | | |
|---|---|---|---|
| 5,794,219 A | 8/1998 | Brown | |
| 7,043,446 B1 | 5/2006 | Dietrich et al. | |
| 7,315,832 B2 | 1/2008 | Bauer et al. | |
| 2002/0082973 A1 | 6/2002 | Marbach et al. | |
| 2007/0130059 A1* | 6/2007 | Lee et al. | 705/37 |
| 2007/0239592 A1* | 10/2007 | Brown et al. | 705/37 |
| 2008/0235126 A1* | 9/2008 | Dueck et al. | 705/37 |

* cited by examiner

*Primary Examiner*—Yogesh C Garg
(74) *Attorney, Agent, or Firm*—Cantor Colburn LLP; Lisa Yamonaco

(57) ABSTRACT

A method for auctioning an asset, the method including: displaying a description of the asset; receiving a bid from a bidder, each bid having a price the bidder is willing to pay and a number of other bidders with which the bidder is willing to share the asset; solving an optimization problem that maximizes revenue by determining a first set of winning bidders; determining a first sum by summing the prices offered by the bidders in the first set; solving the optimization problem with the winning bidders excluded to determine a second set of winning bidders; determining a second sum by summing the prices offered by the bidders in the second set; allocating the asset to each bidder in the first set; and charging each bidder in the first set a payment derived from at least one of the first sum and the second sum.

1 Claim, 3 Drawing Sheets

METHOD AND SYSTEM FOR AUCTION OF ASSETS WITH NON-EXCLUSIVITY OF USE

BACKGROUND

1. Field of the Invention

This invention relates to techniques for auctioning assets that can be shared to maximize revenue.

2. Description of the Related Art

Intangible assets such as patents, know-how and intellectual property can be rapidly appreciating assets, but they are highly illiquid. Patent holders are eager for alternative means for monetizing their ideas and intellectual assets. A major hindrance in monetizing intangible intellectual assets is the lack of an outlet to trade such assets. From the buyer side, acquiring patents and attendant know-how can be the key to market leadership in developing new products and services. This problem has been identified as a key challenge by many companies.

For patent and other intellectual property (IP) marketplaces to take off in a significant way, they must (i) differentiate the quality of patents, (ii) ensure market participants act with integrity, (iii) provide flexible market infrastructure supporting different forms of innovation, and lastly but importantly (iv) generate IP value fairly for all participants based on open market dynamics. All of these factors depend on whether or not such markets use mechanisms that are efficient and robust to manipulation.

One feature of flexible IP marketplaces is that they support various forms of ownership. For example, a patent license can either be given exclusively to a single entity, or it can be given non-exclusively to two or more companies (e.g., licenses for using a type cell phone technology). However, if an entity is sharing an IP license, the value the entity can derive from the license is necessarily reduced if the entity shares the license with k (k representing a number) others as opposed to if the entity were to not share the license, or share the license with k−1 other entities. The entity selling the IP license can decide on how many will share the license depending on what number of licensees will maximize the entity's total revenue.

The problem of maximizing the total revenue received from selling non-exclusive licenses is not unique to IP markets. For example, how does a golf club maximize revenue from selling golf club memberships? The value derived depends on exclusivity of the memberships. Of course, the value or utility each member derives depends on whether 100 people share it, or 500 people share it. But how is the golf club to determine how many people to grant membership to maximize its revenue? Another potential market needing to maximize revenue for selling non-exclusive assets is the market for selling rare or limited collector items such as limited edition cars. The car maker needs to determine how many limited edition cars to make.

Therefore, what are needed are techniques that maximize revenue for selling assets that may have non-exclusive use.

BRIEF SUMMARY

The shortcomings of the prior art are overcome and additional advantages are provided through the provision of a method for auctioning an asset, the method including: displaying a description of the asset; receiving a bid from a bidder, each bid having a price the bidder is willing to pay and a number of other bidders with which the bidder is willing to share the asset; solving an optimization problem that maximizes revenue by determining a first set of winning bidders; determining a first sum by summing the prices offered by the bidders in the first set; solving the optimization problem with the winning bidders excluded to determine a second set of winning bidders; determining a second sum by summing the prices offered by the bidders in the second set; allocating the asset to each bidder in the first set; and charging each bidder in the first set a payment, the payment determined by at least one of: a first payment method wherein the payment is computed by dividing the second sum by the number of winning bidders in the first set; a second payment method wherein the payment is computed by dividing the second sum by the first sum and multiplying the result by the price offered by the bidder to which the payment is charged; and a third payment method derived from at least one of the first sum and the second sum.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which maximizes revenue derived from auctioning an asset that may have non-exclusive use. In particular, the solution determines which bidders the asset shall be allocated to for maximizing the revenue.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

Figure 1:
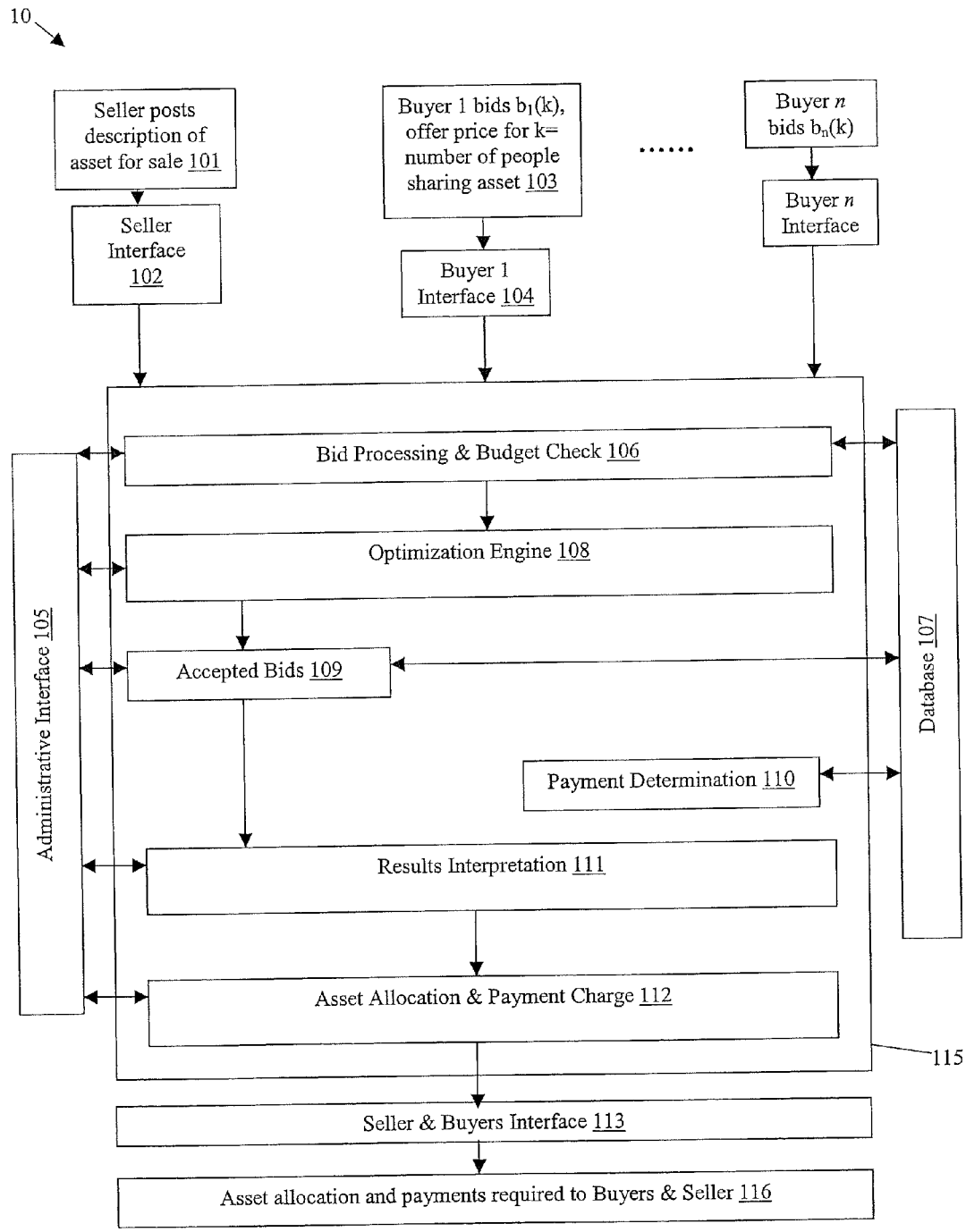
FIG. 1 presents an exemplary embodiment of a system for auctioning an asset that my have non-exclusive use.

The detailed description explains the preferred embodiments of the invention, together with advantages and features, by way of example with reference to the drawings.

DETAILED DESCRIPTION

Disclosed are exemplary embodiments of techniques for selling an asset that may have non-exclusive use. The techniques, which include a method and apparatus, provide for auctioning the asset and determining a number of buyers of the asset to maximize revenue to a seller.

For convenience, certain definitions are presented. The term "non-exclusive use" relates to assets that may be used by more than one party. Examples of assets that may have non-exclusive use include hard intellectual property (IP) such as patents and soft IP such as know-how (e.g., innovative ideas and parts of code). The term "asset" relates to any item being auctioned. Examples of item include a good, a service, intellectual property, and a license.

The techniques facilitate the economic exchange of intangible intellectual assets like patents, know-how and ideas, which are illiquid in nature. The techniques include a market mechanism and platform that allows for the flexibility of allowing non-exclusivity of use of the asset being auctioned. The market mechanism and platform fulfill a need that will not only provide liquidity to the intellectual assets market, but also allow companies to leverage and extract value from patents and technologies that are not being optimally employed.

The market mechanism and platform work if the following way. Each seller in this market (can be technology and service companies as well as private providers) lists the details of what they are offering for auction. The sellers can also have announced or unannounced reservation prices. Buyers looking to own a particular asset then make a bid for the asset or service in that auction. Of course, a buyer can bid in multiple auctions. For each asset or service available for auction, the market mechanism and platform then determine if the reserve price (if any) has been met. If the reserve price has been met, the market mechanism and platform next determine which set of buyers gets to share the asset or service (or have use or ownership of it). The market mechanism and platform then determine the payments of the winning bidders.

In an exemplary embodiment of the market mechanism and platform, suppose a patent is to be auctioned where buyers may get an exclusive or a non-exclusive license to practice the patent. A buyer derives a private utility $v_i(k)$ (decreasing with more sharing) if he has to share it with k−1 other buyers. The i-th buyer specifies a bid $b_i(k)$ for k=1, 2, . . . , K where $b_i(k)$ is the i-th buyer's willingness to pay if the i-th buyer is willing to share the license with k−1 others. These bids are submitted to the system.

The system then determines an allocation, i.e., k*, the number of buyers who will share the license, and the set of buyers ($S_1$) who will share the license. In the exemplary embodiment, k* and $S_1$ are picked such that $(\Sigma_k \Sigma_i b_i(k))$ is maximized, i.e., $(\max \Sigma_k \Sigma_i b_i(k))$.

The system then determines the payment to be made by each winning bidder. The payments can be designed to minimize under-bidding. One such example is given with respect to the exemplary embodiment. Suppose the winning set of k* bidders (henceforth called the winning coalition) have bid a total of $B_1$. Remove the winning coalition bidders, and now again determine the next winning set of bidders. Let the next winning bid total be $B_2$. Then, one payment rule (first-price) is the pay-your-bid rule, where each winning buyer pays his bid. Another payment rule (second-price, egalitarian) is each buyer of the winning coalition pays $B_2/k^*$. The total payment by the winning coalition is $B_2$. Another payment rule (second-price, proportional) is that a buyer i who is in the winning coalition makes a payment in proportion to his bid, i.e., $B_2 * b_i(k^*)/B_1$. Note that again the total payment by the winning coalition is $B_2$.

FIG. 1 presents an exemplary embodiment of a system 10 for auctioning an asset that my have non-exclusive use. Referring to FIG. 1, the system 10 includes a seller interface 102 for a seller to post a description 101 of the asset. The seller interface 102 may also be used for the seller to input a reserve price. Information from the seller interface 102 is input to an auction engine 115. Each buyer may make a bid 103 using a buyer interface 104. Each bid 103 is input to the auction engine 115. Each bid 103 undergoes processing and a budget check using a processing and budget check module 106. An administrative interface 105 provides an interface to the auction engine 115 for an auction administrator. The auction administrator can monitor all phases of the auction engine 115 via the administrator interface 105. Each bid 103 is then stored in a database 107.

Referring to FIG. 1, once all the bids are received, the auction administrator runs an optimization engine 108. Alternatively, the auction engine 115 can be run automatically upon receipt of the bids 103. The optimization engine 108 determines accepted bids 109, which are then stored in the database 107 and displayed via the administrative interface 105.

Referring to FIG. 1, a payment determination system 110 receives from the database 107 each bid 103 and the accepted bids 109 and uses this information to determine required payments to be made by each winning bidder. The optimization engine 108 can also be used to determine the required payments. Required payment information is stored in the database 107 and also sent to a results interpretation system 111. The results interpretation system 111 gathers the accepted bids 109 and the required payment information and forwards this data to an asset allocation and payment charge system 112. The asset allocation and payment charge system 112 performs procedures for allocating the asset and charging each winning bidder with the required payment. The procedures may include those steps necessary for transferring the asset to each winning bidder. For example, the procedures may include executing the documents necessary to transfer the asset to each winning bidder upon receipt of the required payment.

Referring to FIG. 1, the asset allocation to each winning bidder and the required payment of each winning bidder is displayed to the auction administrator via the administrative interface 105. Asset allocation and required payment information 116 are presented to the seller and to each winning bidder via a seller and buyers interface 113. The seller and buyers interface 113 may include the seller interface 102 and each buyer interface 104.

Figure 2A:
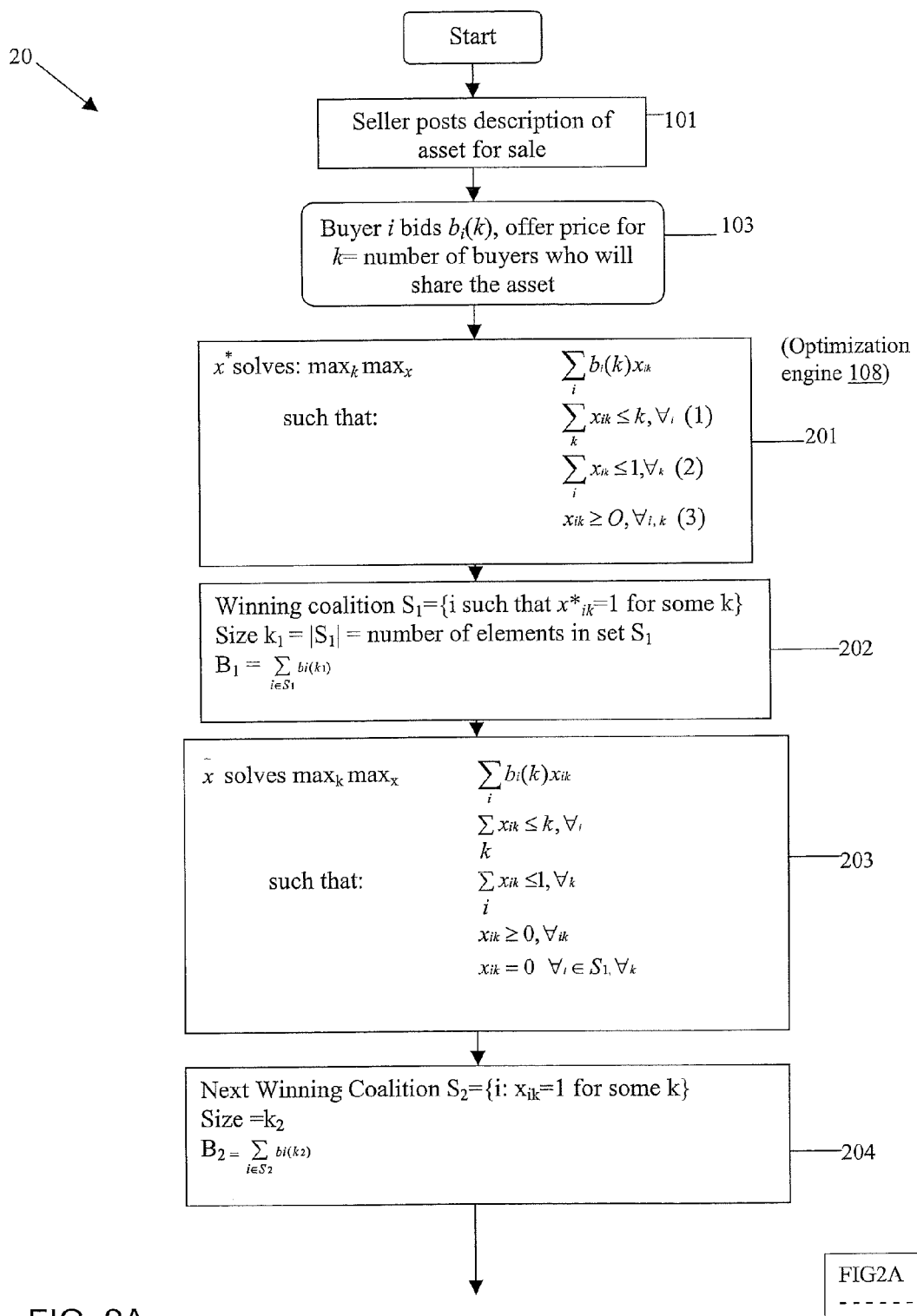
FIG. 2 depicts aspects of a method for auctioning the asset.
Figure 2B:
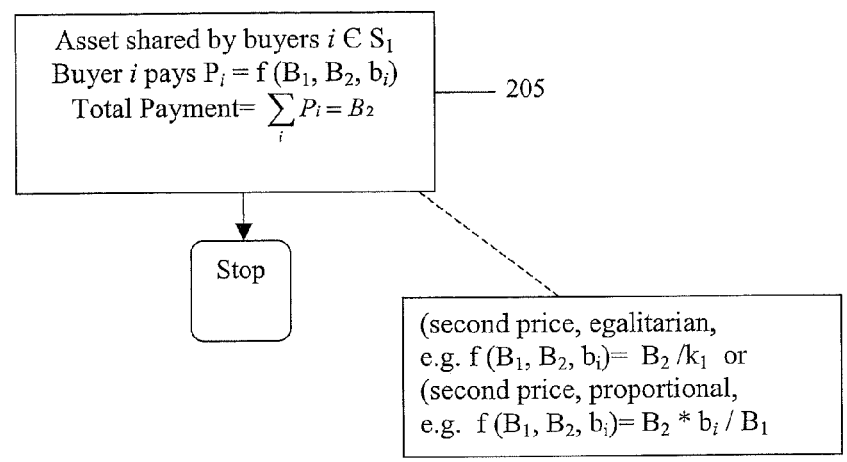

FIG. 2 depicts aspects of a method 20 for auctioning an item which may have non-exclusive use. In one embodiment, the method 20 can be implemented using the auction engine 115. Referring to FIG. 2, step 201 calls for receiving each bid 103. Further, step 201 uses the optimization engine 108 to determine the number of winning bidders k* and the winning bidders x* (i.e., the winning coalition referred to as $S_1$). The optimization engine 108 maximizes the sum of the bids of the winning bidders x*. Step 202 calls for determining the sum, $B_1$, of the k* winning bids. Step 203 calls for determining a second winning coalition, $S_2$, by maximizing the sum of the winning bidders x* if the bidders in the winning coalition $S_1$ are excluded. The second coalition is determined using the optimization engine 108 and setting $x_{ik}=0$ for each of the winning bidders in the winning coalition $S_1$. Step 204 calls for determining the sum, $B_2$, of the bids of the second winning coalition $S_2$. Step 205 calls for determining the payments required by the winning coalition $S_1$. In general, the payment required from each winning bidder is a function of $(B_1, B_2, b_i)$ where $b_i$ is the bid of the i-th winning bidder. In general, step 205 can call for using at least one of the second price/egalitarian payment method and the second-price/proportional payment method to determine the required payments. Step 205 can also include charging each bidder of the winning coalition $S_1$ with the determined payment.

When soft IP assets (such as non-patented computer code) are auctioned, the seller provides a brief description of the asset and suggests a reserve price. Bidders submit bids that that include a price the bidder is willing to pay and a number of other bidders the bidder is willing to share the asset with. The bidder can denote k=1 for designating not willing to share the asset with any other bidders. The optimization engine 108 determines the winning coalition $S_1$ to maximize revenue to the seller. The winning bidders are required to sign a non-disclosure agreement and then, upon receipt by the seller of the required payment, allowed to view the details of the asset to complete the auction.

The capabilities of the present invention can be implemented in software, firmware, hardware or some combination thereof. The software can be run on a computer processing system. The computer processing system generally includes an operating system, a central processing unit, memory, a storage device, an input interface, an output interface, an input device such as a keyboard or mouse, an output device such as a display, and a network interface for coupling to the Internet or a local area network for example. As these devices are well known, they are not discussed in detail herein.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computerized method, for auctioning an asset, implemented by executable software embodied in a computer system, the computerized method comprising:

displaying a description of the asset;

receiving a bid from a bidder, each bid comprising a price the bidder is willing to pay and a number of other bidders with which the bidder is willing to share the asset;

solving an optimization problem that maximizes revenue by determining a first set of winning bidders;

determining a first sum by summing the prices offered by the bidders in the first set;

solving the optimization problem with the winning bidders excluded to determine a second set of winning bidders;

determining a second sum by summing the prices offered by the bidders in the second set;

allocating the asset to each bidder in the first set; and charging each bidder in the first set a payment, the payment determined by at least one of:

a first payment method wherein the payment is computed by dividing the second sum by the number of winning bidders in the first set;

a second payment method wherein the payment is computed by dividing the second sum by the first sum and multiplying the result by the price offered by the bidder to which the payment is charged; and a third payment method wherein the payment is derived from at least one of the first sum and the second sum; and wherein all of the steps of the method are executed by the executable software.

* * * * *

UNITED STATES PATENT AND TRADEMARK OFFICE
CERTIFICATE OF CORRECTION

| | | |
|---|---|---|
| PATENT NO. | : 7,516,093 B1 | Page 1 of 1 |
| APPLICATION NO. | : 12/164207 | |
| DATED | : April 7, 2009 | |
| INVENTOR(S) | : Parijat Dube and Rahul Jain | |

It is certified that error appears in the above-identified patent and that said Letters Patent is hereby corrected as shown below:

Title page item (75), change Inventor's name from "Rahul Jan" to -- Rahul Jain --.

Signed and Sealed this
Thirty-first Day of July, 2012

David J. Kappos
*Director of the United States Patent and Trademark Office*